INVENTOR
SATORU NAKANO
BY Arthur Schwartz
ATTORNEY

United States Patent Office 3,671,167
Patented June 20, 1972

3,671,167
INCINERATOR FOR WASTE OIL AND THE LIKE
Satoru Nakano, Ootsushi, Japan, assignor to Iwatani & Co., Ltd., Osaka, Japan
Filed Jan. 15, 1971, Ser. No. 106,743
Claims priority, application Japan, June 12, 1970, 45/51,131, 45/51,132
Int. Cl. F23l 9/00
U.S. Cl. 431—190    11 Claims

ABSTRACT OF THE DISCLOSURE

This invention provides an incinerator adapted to dispose of waste products containing water and earth, which are otherwise difficult to completely burn, in which the substance is atomized by a jet of primary air, and burned in an admixture with secondary and tertiary air, under automatic control of the air supply, and includes stirring of the substance by rotating vanes in accordance with its burning condition.

BACKGROUND AND OBJECTS

This invention relates to an incinerator adapted to dispose of organic waste products in a complete manner, the waste product being of the type which contains a quantity of water and earth, such as used oil, tar and pitch.

More specifically, the invention is concerned with an incinerator adapted to consume organic waste products of relatively high viscosity, such as used oil, tar, and pitch, hereinafter merely called waste oil, which would otherwise be difficult to completely burn because of its water and earth content. The burning is accomplished by the mixing of air with the waste oil to be incinerated while automatically controlling the air supply in response to the burning condition.

An object of the invention is to provide an incinerator for disposing of waste products of the above type without creating air pollution problems. Throughout the world, the greatest concern for modern society is a public hazard problem created by industrial wastes, among which is waste oil which tends to foul water and cause fire and odor. A difficulty involved in waste oil is its incombustible property owing to water and earth content, these elements existing inseparably from the oil content, i.e., in the emulsive state.

The basic idea of the present invention is that the waste oil is atomized by the jet of primary air, filling a combustion chamber with oil particles which are burned in a state of being well mixed with secondary and tertiary air. The air supply is automatically controlled and the remaining waste oil on the bottom is stirred at an adequate speed in accordance with the burning condition of the waste oil, thus accomplishing the constant mixture of air with the incinerating substance. This enables the substance to burn in a continuous and complete manner. The dirt or earth particles contained in the waste oil settles and may be removed, thereby providing no difficulty in the combustion of the waste oil.

SUMMARY OF THE INVENTION

In one embodiment, an incinerator according to the invention comprises a vertical combustion chamber with a pipe supplying the waste oil to be consumed. The pipe outlet is placed inside the combustion chamber and a rotary cylinder is provided at the center of the bottom floor of the combustion chamber. The cylinder has its upper end projecting into the combustion chamber. There are cylindrical arms radially and horizontally secured to the top end of the rotary cylinder, the rotary cylinder and the arms internally communicating with one another to provide passages of air. The cylindrical arms have on their underfaces vanes extending toward the bottom floor of the combustion chamber, and air outlet openings are provided along their full length. The side wall of the combustion chamber includes further air outlet openings. There is means for controlling the supply entering the combustion chamber mounted in the upper side wall of the combustion chamber. The controlling means is electrically connected to motors of blowers via an air-supply control circuit, thereby supplying air in an adequate amount in response to the burning condition of the waste oil. A means for controlling the rotating speed of the rotary cylinder is electrically connected to a motor for driving the rotary cylinder, the speed being in response to the burning condition of the waste oil, thereby ensuring the adequate stirring of the waste oil at the bottom floor of the combustion chamber by means of the vanes of the cylindrical arms.

BRIEF DESCRIPTION OF THE DRAWINGS

The invention will be more particularly illustrated by way of example, with reference to the accompanying drawing illustrated wherein.

DETAILED DESCRIPTION

Figure 1:
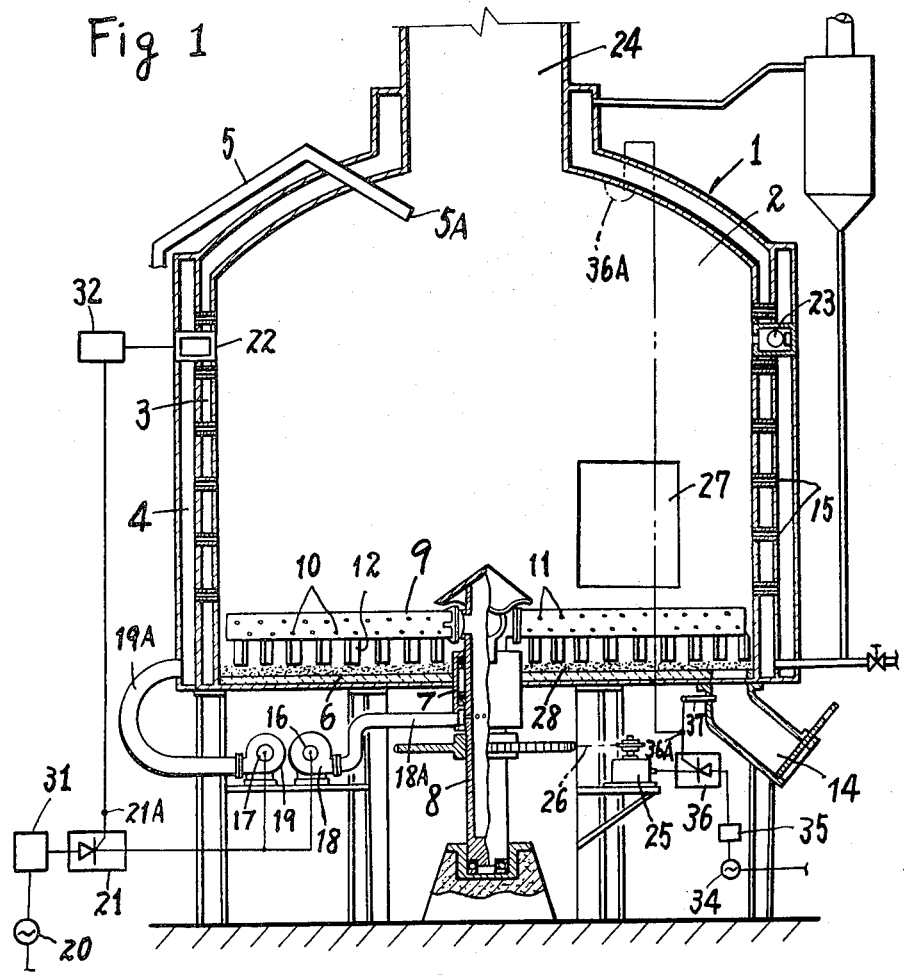
FIG. 1 is a vertical cross-sectional view showing an incinerator according to the invention.
Figure 2:
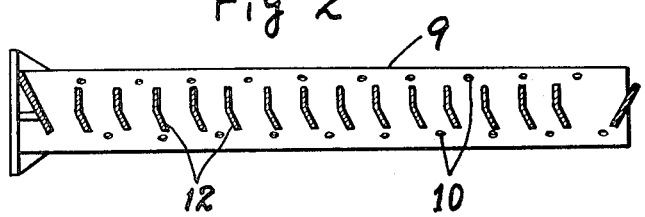
FIG. 2 is a bottom view of the cylindrical arm provided with vanes at its underface.
Figure 3:
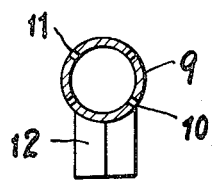
FIG. 3 is a cross section of the arm illustrated in FIG. 2.

The body of an incinerator 1 has a three-fold enclosure, i.e., an innermost combustion chamber 2, a middle water jacket 3 around the combustion chamber 2 to prevent possible overheating and an outermost third-air chamber 4.

Waste oil to be incinerated is supplied into the combustion chamber 2 through an outlet 5A of a supply pipe 5 entering from outside the combustion chamber 2. Ash residue is discharged through an outlet 14 provided at the bottom of the combustion chamber, as near to its corner as possible. A bottom floor 6 of the combustion chamber is provided with a bearing 7 at its center, which rotatably supports a rotary cylinder 8 having its upper end extending into the combustion chamber 2. The upper end of the rotary cylinder 8 is provided with a number of radially extending cylindrical arms 9 positioned parallel to the bottom floor 6 of the combustion chamber 2. The rotary cylinder 8 and the cylindrical arms 9 communicate internally with one another, providing passages of primary and secondary air. Two types of air are blown into the passages by means of a pair of blowers 18 and 19. In the example illustrated, the blower 18 is connected to the rotary cylinder 8. The cylindrical arms 9 have vanes 12 secured to their underfaces. The vanes are spaced from each other and are positioned adjacent to the bottom floor 6. In addition, the arms 9 are provided with primary air outlets 10 and secondary air outlets 11. Preferably, the former are directed diagonally downward, and the latter are directed diagonally upward. The side wall of the combustion chamber 2 is provided with third air outlets 15 communicating with the third air chamber 4, to which the tertiary air is transferred by means of a blower 18 or 19. In the example illustrated, it is blown by a blower 19. The blowers 18 and 19 are driven by D.C. motors 16 and 17, respectively, all of which are mounted at convenient locations under the combustion chamber 2. Furthermore, in the example illustrated, the blower 18 is connected to the rotary cylinder 8 through a duct 18A, whilst the blower 19 is connected to the third air chamber 4 through a duct 19A. Thus, air is blown under pressure into the combustion chamber 2 through its respective route as primary, secondary and tertiary air.

The D.C. motors 16 and 17 are connected to an A.C. source 20 through a silicon controlled rectifier 21 and a full-wave rectifier 31. The gate 21A of the silicon controlled rectifier 21 is electrically connected to a photodiode 22 through a phase-reversing circuit 32. The photodiode 22 is mounted in the side wall of the combustion chamber 2. Mounted opposite diode 22 is a light projector 23, diode 22 thereby electrically detecting the burning condition of the waste oil inside the combustion chamber 2 through changes in the strength of the light beam received from the projector 23.

The rotary cylinder 8 is rotated by a motor 25 by means of a chain-and-sprocket unit 26. The motor 25 is a D.C. speed-reduction motor, and is connected to an A.C. source 34 through another all-wave rectifying circuit 35 and a silicon controlled rectifier 36, the gate 36A of which is connected to a thermoelectric thermometer 37 provided at the ash discharging outlet 14. Hence, when the discharged ashes are still red-hot, the condition is sensed by the thermoelectric thermometer, and the motor 25 is caused to slow down, reducing the rotating speed of the rotary cylinder 8. In this way, adequate stirring of the waste oil is ensured so as to lead to its complete combustion. In the reverse case, the motor 25 is caused to speed up, avoiding unnecessary build-up of the waste oil on the bottom floor 6. In place of the thermoelectric thermometer 37, a resistance thermometer or a bimetal can be of course used. Alternatively, instead of detecting the temperature of ash residue, it is also possible to electrically examine the color of the flames brought about through the burning of the waste oil. This may be accomplished by placing a photoconductive cell or a photoelectric tube thermometer in the top wall of the combustion chamber 2 as shown by the imaginary line in FIG. 1, connected to the gate 36A of the silicon rectifier 36.

Smoke, if any, is discharged from the combustion chamber 2 through a chimney 24. The burning condition of the waste oil is visually viewed through a window 27. The bottom floor of the combustion chamber 2 is covered with sand or ash 28.

OPERATION

The operation and effect of this invention will be described as follows:

First of all, the motors 25, 16 and 17 are driven to actuate the rotary cylinder 8, and the blowers 18 and 19, respectively. Subsequently, a combustible agent, such as light oil, is initially supplied through the outlet 5A of the supplying pipe 5 only for igniting purposes. After it has been ignited, a valve (not shown) is switched to stop its supply, and to start the supply of waste oil to be incinerated. The waste oil falls, drop by drop, around the center of the bottom floor 6, where the waste oil is stirred by the vanes 12 of the rotating cylindrical arms 9, and is atomized by the jet of primary air. In the course of rising in the combustion chamber 2, the atomized waste oil is burned. On the other hand, the waste oil remaining on the bottom floor 6 is gradually conveyed to the corner of the bottom floor 6, creating eddies thereon. In the course of its conveyance it is substantially burned out, leaving solid carbon residue on the bottom floor 6, which is broken down into pieces by the vanes 12, and which is taken away from the oil surface. Finally, the residue is discharged out of the bottom floor 6 through the outlet 14. In this case, the temperature of the ash is examined by the thermoelectric thermometer 37, which is transmitted to the motor 25, thereby controlling its rotating speed to ensure the adequate stirring of the waste oil by the vanes 12.

In consequence of the combustion of the waste oil, gas is created in the combustion chamber 2, which gas is completely consumed as it is burned in its admixture with secondary and tertiary air, without the possibility of air-pollution when it is discharged out of the chimney 24. When incomplete combustion takes place due to the shortage of oxygen, with smoke filling the combustion chamber 2, the beam of light from the projector 23 is only weakly received by the photo-diode 22, which transmits a signal to the silicon controlled rectifier 21 through the phase-reversing circuit 32, thereby speeding up the motors 16 and 17 to increase the air supply into the combustion chamber 2. When smoke disappears or is weakened, in which case the beam of light from the projector 32 is thus strongly received by the photo-diode 22, the motors 16 and 17 return to their respective normal speed. In this way the adequate amount of air is automatically adjusted in accordance with the burning condition of the waste oil in the combustion chamber 2, ensuring the complete combustion of the waste oil.

In place of the photo-diode 22 mentioned above, a photo-transistor or a photo-cell can be employed.

Under the system thus constructed, in which waste oil successively supplied into the combustion chamber is stirred by the vanes of the rotating cylindrical arms on the bottom floor of the combustion chamber, during which primary air is jetted to atomize it, waste oil otherwise hard to burn is easily burned in its well admixture with air, under automatic control of airsupply into the combustion chamber. The stirring of the waste oil, in response to the burning condition thereof, thus provides labor-saving equipment without any problem of air pollution and public hazard by harmful gases. An incinerator according to this invention thus meets urgent needs of modern society which badly suffers from air and water pollution by waste products, such as waste oil.

What is claimed is:

1. An incinerator for waste oil and similar waste products comprising:
    (a) a combustion chamber means for supplying waste oil to be incinerated, having an outlet positioned inside said combustion chamber,
    (b) a rotary cylinder provided at about the center of the bottom floor of said combustion chamber, having one end projecting into said combustion chamber,
    (c) arms radially and substantially horizontally secured to said one end of said rotary cylinder,
    (d) said rotary cylinder and said arms being internally connected to one another to provide air passages, said arms being provided at their underfaces with vanes extending toward said bottom floor of the combustion chamber,
    (e) said arms further having air outlet openings along their length,
    (f) a side wall of said combustion chamber being provided with further air outlet openings,
    (g) means for controlling the air supply into said combustion chamber mounted in the upper side wall thereof, and electrically connected to blowers via an air-supply control circuit, thereby supplying air in an adequate amount in response to the burning condition of the waste oil, and
    (h) means for controlling the rotating speed of said rotary cylinder electrically connected to means for driving the rotary cylinder in response to the burning condition of the waste oil at the bottom floor of said combustion chamber by means of said vanes.

2. An incinerator according to claim 1, wherein said air supply controlling means comprises a photo-diode and a light projector mounted opposite said photo-diode.

3. An incinerator according to claim 1, wherein said means for controlling the air supply comprises a photo-transistor and a light projector mounted opposite said photo-transistor.

4. An incinerator according to claim 1, wherein said means for controlling the air supply comprises a photo-conductive cell.

5. An incinerator according to claim 1, wherein said means for controlling the rotating speed of the rotary cylinder includes a thermoelectric thermometer provided at an outlet discharging ash residue.

6. An incinerator according to claim 1, wherein said means for controlling the rotating speed of the rotary cylinder includes a resistance thermometer provided at an outlet discharging ash residue.

7. An incinerator according to claim 1, wherein said means for controlling the rotating speed of the rotary cylinder includes a bimetallic device provided at an outlet discharging ash residue.

8. An incinerator according to claim 1, wherein said means for controlling the rotating speed of the rotary cylinder includes a photoelectric tube thermometer provided in the ceiling of the combustion chamber and electrically connected to the means for driving the rotary cylinder.

9. An incinerator according to claim 1, wherein the vanes on said arms are bent at about their middle in the outward direction.

10. An incinerator according to claim 1, wherein the air outlet openings in the arms include two groups, one group being directed diagonally downward, and the other group being directed diagonally upward.

11. An incinerator according to claim 1, wherein said combustion chamber is vertical and said arms are cylindrical.

References Cited

UNITED STATES PATENTS

| | | | |
|---|---|---|---|
| 2,402,436 | 6/1946 | Nichols | 110—13 |
| 2,505,363 | 4/1950 | Nichols | 110—15 |
| 2,548,086 | 4/1951 | West et al. | 110—36 |
| 2,815,806 | 12/1957 | McGillis | 431—168 X |
| 3,168,074 | 2/1965 | Kuhner et al. | 110—7 X |

EDWARD G. FAVORS, Primary Examiner

U.S. Cl. X.R.

110—7, 36